United States Patent [19]

Niki

[11] Patent Number: 5,724,445
[45] Date of Patent: Mar. 3, 1998

[54] IMAGE PROCESSING METHOD AND APPARATUS

[75] Inventor: Toru Niki, Yokohama, Japan

[73] Assignee: Canon Kabushiki Kaisha, Tokyo, Japan

[21] Appl. No.: 361,692

[22] Filed: Dec. 29, 1994

Related U.S. Application Data

[63] Continuation of Ser. No. 913,046, Jul. 14, 1992, abandoned.

[30] Foreign Application Priority Data

Jul. 23, 1991 [JP] Japan ............................. 3-182514

[51] Int. Cl.$^6$ .................................................. G06K 9/34
[52] U.S. Cl. ........................................ 382/177; 382/187
[58] Field of Search .................................. 382/177, 178, 382/179, 119, 187, 188, 313, 314

[56] References Cited

U.S. PATENT DOCUMENTS

| | | | |
|---|---|---|---|
| 3,164,806 | 1/1965 | Rabinow | 382/177 |
| 3,274,551 | 9/1966 | Rohland | 382/22 |
| 3,629,826 | 12/1971 | Cutaia et al. | 382/178 |
| 3,713,098 | 1/1973 | Muenchhausen | 340/146 |
| 3,969,700 | 7/1976 | Bollinger et al. | 382/177 |
| 4,365,234 | 12/1982 | Henrichon, Jr. | 340/146.3 |
| 4,395,699 | 7/1983 | Sternberg | 382/41 |
| 4,466,121 | 8/1984 | Damen et al. | 382/177 |
| 4,607,385 | 8/1986 | Maeda | 382/9 |
| 4,850,025 | 7/1989 | Abe | 382/177 |
| 5,050,218 | 9/1991 | Ikeda et al. | 382/1 |

FOREIGN PATENT DOCUMENTS

| | | |
|---|---|---|
| 55-78379 | 6/1980 | Japan. |
| 64-41069 | 2/1989 | Japan. |

OTHER PUBLICATIONS

"OCR Reader Recognizes Common Fonts, Skips Unreadable Data", Computer Design, vol. 18, No. 11, Nov. 1979, p. 68.

*Primary Examiner*—Joseph Mancuso
*Attorney, Agent, or Firm*—Fitzpatrick, Cella, Harper & Scinto

[57] ABSTRACT

An image recognition method and apparatus in which a character region is setmented from input image information and the segmented character regions are recognized. Segmenting and recognition of character regions are performed in parallel with the input of image information. In response to to an interruption in input of image information, the recognition process is halted until the segmenting process is completed. Thereafter, recognition processing may be performed on any desired ones of the segmented character regions.

14 Claims, 10 Drawing Sheets

1

IMAGE PROCESSING METHOD AND APPARATUS

This application is a continuation of application Ser. No. 07/913,046 filed Jul. 14, 1992, now abandoned.

BACKGROUND OF THE INVENTION

1. Field of the Invention

This invention relates to an image processing method and apparatus for segmenting and recognizing character information of an input image.

2. Description of the Related Art

A conventional image processing apparatus which can perform character recognition processing is configured as shown in FIG. 12. In FIG. 12, A scanner unit 41 converts a character image of a subject to be read into an analog electric signal. A preprocessing unit 42 performs binary-coding processing of analog signals and removal of noise. A character segmenting unit 43 separates respective characters in a character string. A characteristic extraction unit 44 extracts plural characteristics peculiar to a single character according to a predetermined algorithm and generates characteristic vectors. A recognition dictionary 45 stores statistics (average, variance and the like) of characteristic vectors for each character. A collation unit 46 collates characteristic vectors obtained from an input character image with the recognition dictionary and selects the most suitable candidate. A word dictionary 47 stores results of translated words. A dictionary retrieval unit 48 refers a recognized character string to the word dictionary and takes out the corresponding translated word. A display unit 49 displays the translated word.

Processing of the above-described recognition unit is performed according to the following two methods. In the first method, segmenting and recognition processing is started after determining that the entirety of an input image has been stored in an image buffer. In the second method, segmenting and recognition processing is started for each portions of the images as soon as the portion is stored in an image buffer.

In the first method, since segmenting and recognition processing is started after the entirety of an input image has been stored in an image buffer, processing time required for the entire process becomes long.

In the second method, recognition processing is performed for the entire input character string. However, if it is desired to recognize and translate only a certain target word, processing for portions of the character string other than the target word becomes unnecessary processing. In general, in an apparatus which inputs a character string while translating it, words immediately before and after the word to be translated are also read. This is because image reading and processing occur in parallel. Suppose, for example, that in trying to translate a word "great", words immediately before and after the word are read and a character string "a great many" is stored in the image buffer. In such a case, although recognition processing is necessary only for the word "great", segmenting and recognition processing is performed for the entire character string "a great many", since the processing is sequentially performed for respective words. While segmenting processing must be performed for all the words, recognition processing is originally needed only for the word "great". As a result, additional time is wasted for recognition processing for the words "a" and "many".

SUMMARY OF THE INVENTION

In the present invention, recognition of character information segmented from input image information is sequentially performed while the image information is input, and segmenting processing of characters is preferentially peformed when the iput of the image information is interrupted, whereby characters other than a character desired to be recognized need not be recognized, and processing time is shortened.

In one aspect, an image processing method and apparatus involve segmenting character regions from image information and recognizing the segmented character regions, wherein segmentation and recognition occur in parallel with inputting the image information. In response to an interruption in inputting image information, recognition is interrupted and instead segmentation is performed. Recognition remains interrupted at least until when segmentation is completed. Thereafter, recognition may be performed on desired ones of the segmented character regions.

In another aspect, an image processing method and apparatus involve segmenting character regions from image information and recognizing the segmented character regions, wherein segmentation and recognition occur in parallel with inputting the image information. In response to an interruption in inputting image information, recognition is interrupted and instead segmentation is performed. Recognition remains interrupted at least until when a signal to activate recognition is input. Thereafter, recognition may be performed on desired ones of the segmented character regions.

Objectives and advantages in addition to those discussed above shall be apparent to those skilled in the art from the description of the preferred embodiment of the invention which follows. In the description, reference is made to the accompanying drawings, which form a part hereof, and which illustrates an example of the invention. Such example, however, is not exhaustive of the various embodiments of the invention, and therefore reference is made to the appended claims for determining the scope of the invention.

DESCRIPTION OF THE PREFERRED EMBODIMENT

Figure 1:
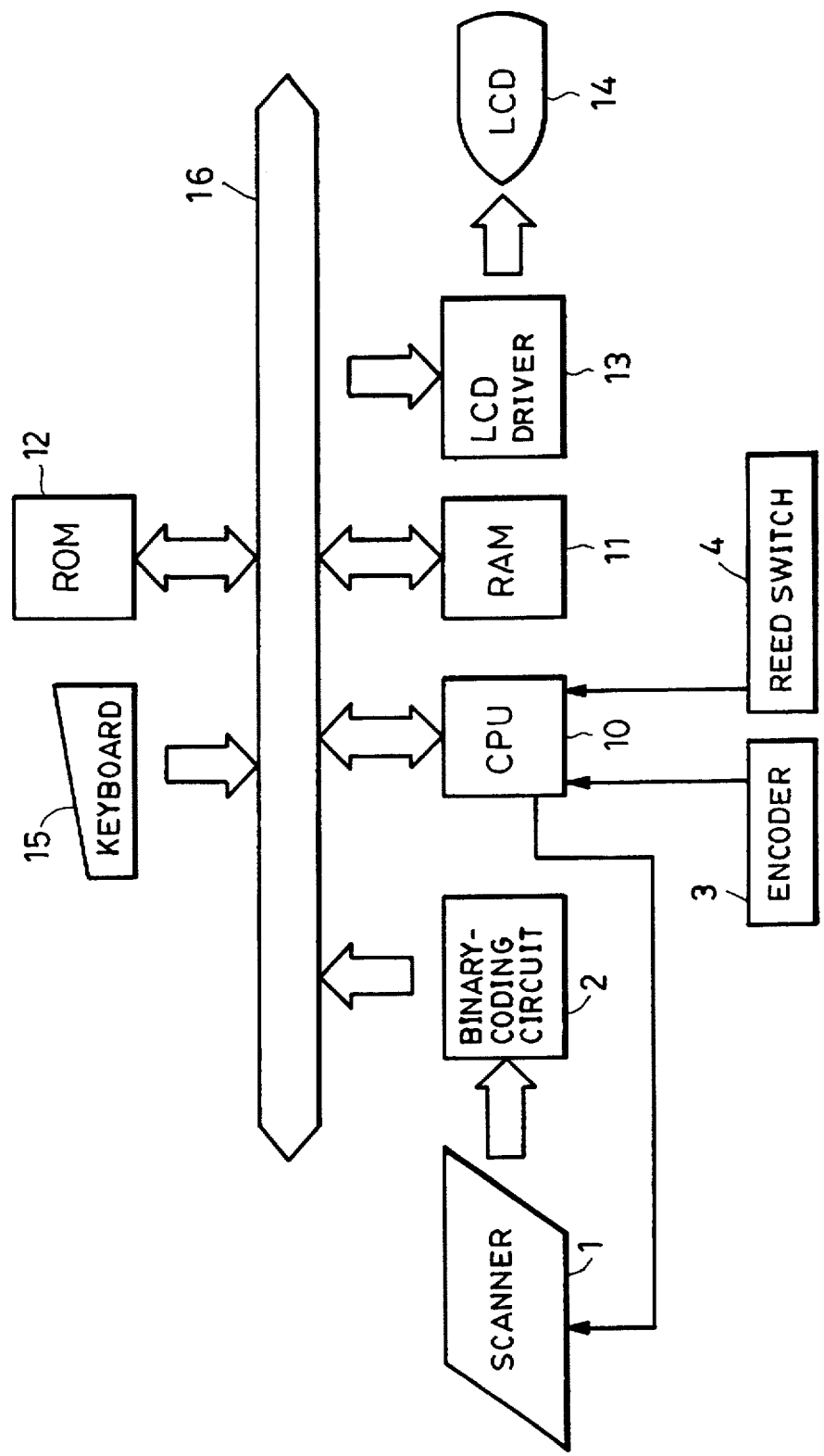
FIG. 1 is a diagram showing the configuration of an embodiment of the present invention.

FIG. 1 is a block diagram showing the configuration of an embodiment of the present invention. FIG. 1 shows the configuration of a recognition-type electronic dictionary which performs character recognition by manually reading an English document, and displaying a Japanese word corresponding to an English word by performing dictionary retrieval using the result of the character recognition.

In FIG. 1, a scanner 1 reads image information of an object to be read while converting the information into an analog signal. A binary-coding circuit 2 converts the analog signal output from the scanner 1 into a binary digital signal. An encoder unit 3 rotates in synchronization with a reading operation by manual scanning, detects the rotation by a photo-interrupter, and outputs a signal synchronized with the manual scanning. A reed switch 4 monitors a pushing state of a roller for providing the encoder 3 with rotation, and detects the end of a reading operation. A central processing unit (CPU) 10 comprises a large-scale integrated circuit (LSI) including an interruption input port, an interruption control circuit, a clock pulse generator, an operation decoder, registers, an arithmetic logic unit (ALU), an input port, an output port, and an image input shift register. A random access memory (RAM) 11 includes readable/writable storage units allocated for respective addresses. The storage unit has a memory function of storing data, a flag function of storing the result of a determination, a counting function of storing a state as a count value, a register function of temporarily storing data, and the like. A read-only memory (ROM) 12 stores microprograms to be sequentially executed by the CPU 10, a recognition dictionary, an English-Japanese dictionary, and encoded constants used in various kinds of determinations. A liquid-crystal display driver (LCD driver) 13 receives output data and generates a signal for displaying the data on a liquid-crystal display (LCD) 14. An external bus line 16 includes an external-address bus and an external-data bus. Addressing of the ROM 12 and the RAM 11, exchange of data, and the like are performed via the external bus line 16.

Figure 2:
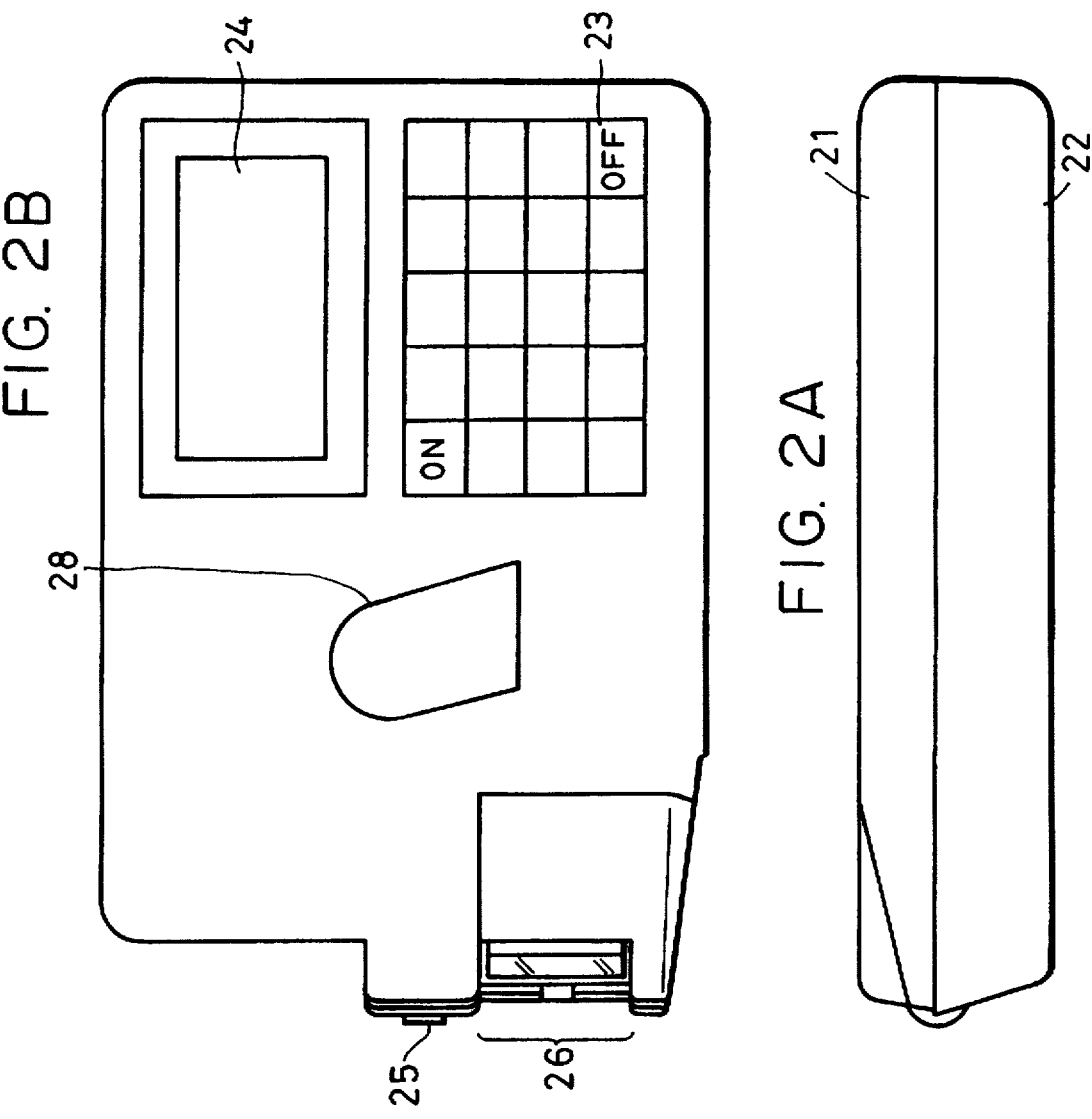
FIGS. 2A, 2B and 2C are views showing an external appearance of an information processing apparatus according to the embodiment shown in FIG. 1.

FIGS. 2A, 2B and 2C are views showing the external appearance of an information processing apparatus of the present embodiment. In FIG. 2A, there are shown an upper case 21 and a lower case 22. FIG. 2B shows input keys 23, a liquid-crystal display unit 24, a roller 25 for transmitting rotation to the encoder, a reading unit 26, and a recess 28 for a thum for increasing holdability. FIG. 2C shows a marker 27 for reading.

Figure 3:
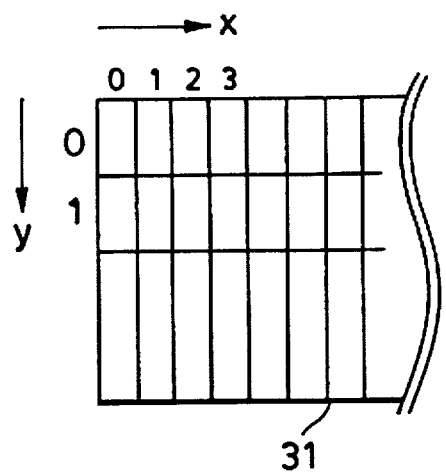
FIG. 3 is a schematic diagram illustrating a method of storing data in an image buffer.

First, an explanation will be provided of an image buffer arranged in the RAM with reference to FIG. 3. The scanner used in the present embodiment comprises a one-dimensional line sensor in which image data are received in units of a line. In the schematic diagram of the image buffer shown in FIG. 3, reference numeral 31 schematically indicates the image buffer arranged in the RAM, where the x direction and the y direction are termed a column and a row, respectively. Received image data for one column are sequentially stored from the left to the right starting with the 0-th column. Since image data are already binary-coded, "1" and "0" on the image buffer correspond to a black pixel (picture element) and a white pixel on the original image, respectively.

Figure 4:
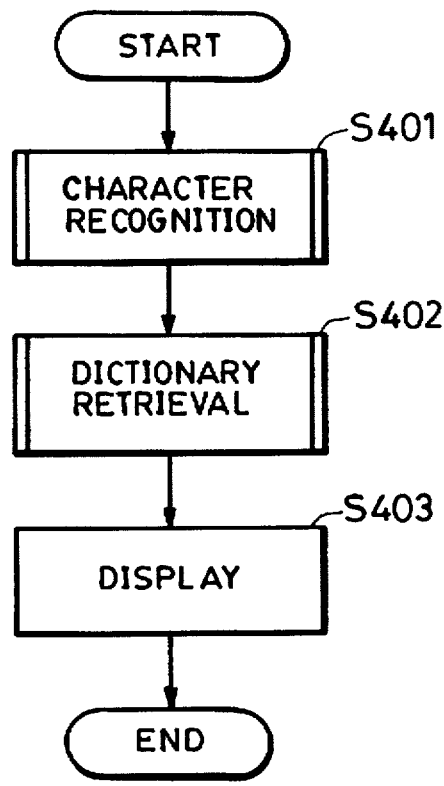
FIG. 4 is a flowchart showing the entire processing.
Figure 5:
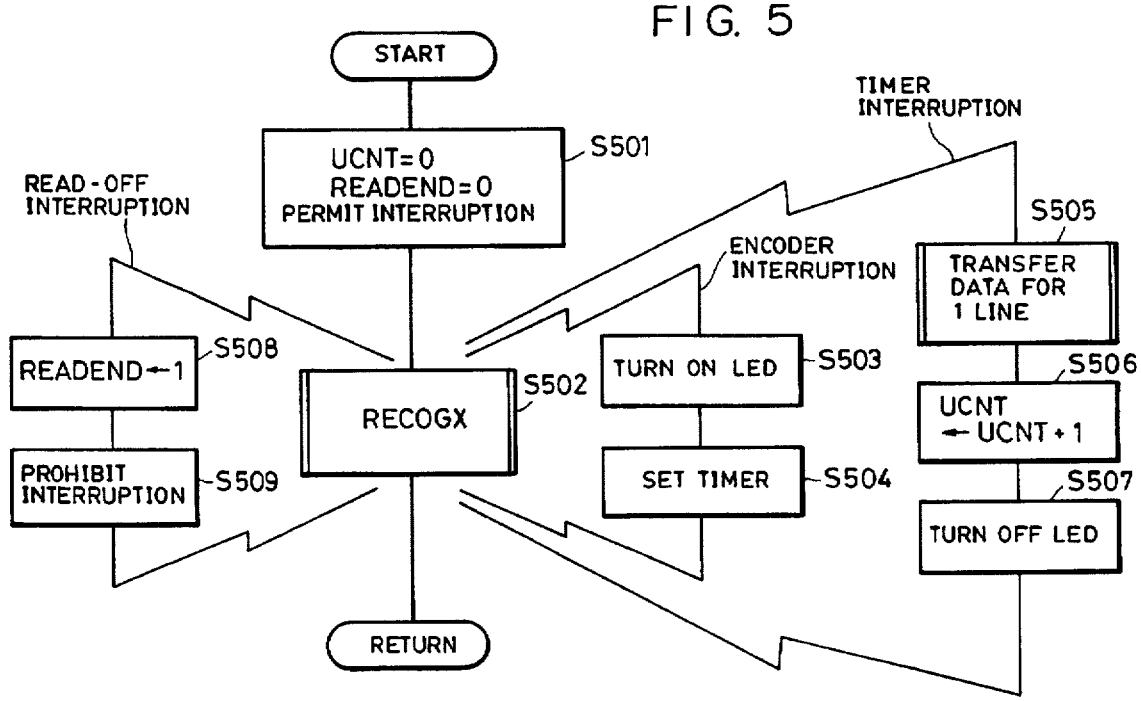
FIG. 5 is a flowchart showing character recognition processing.
Figure 6:
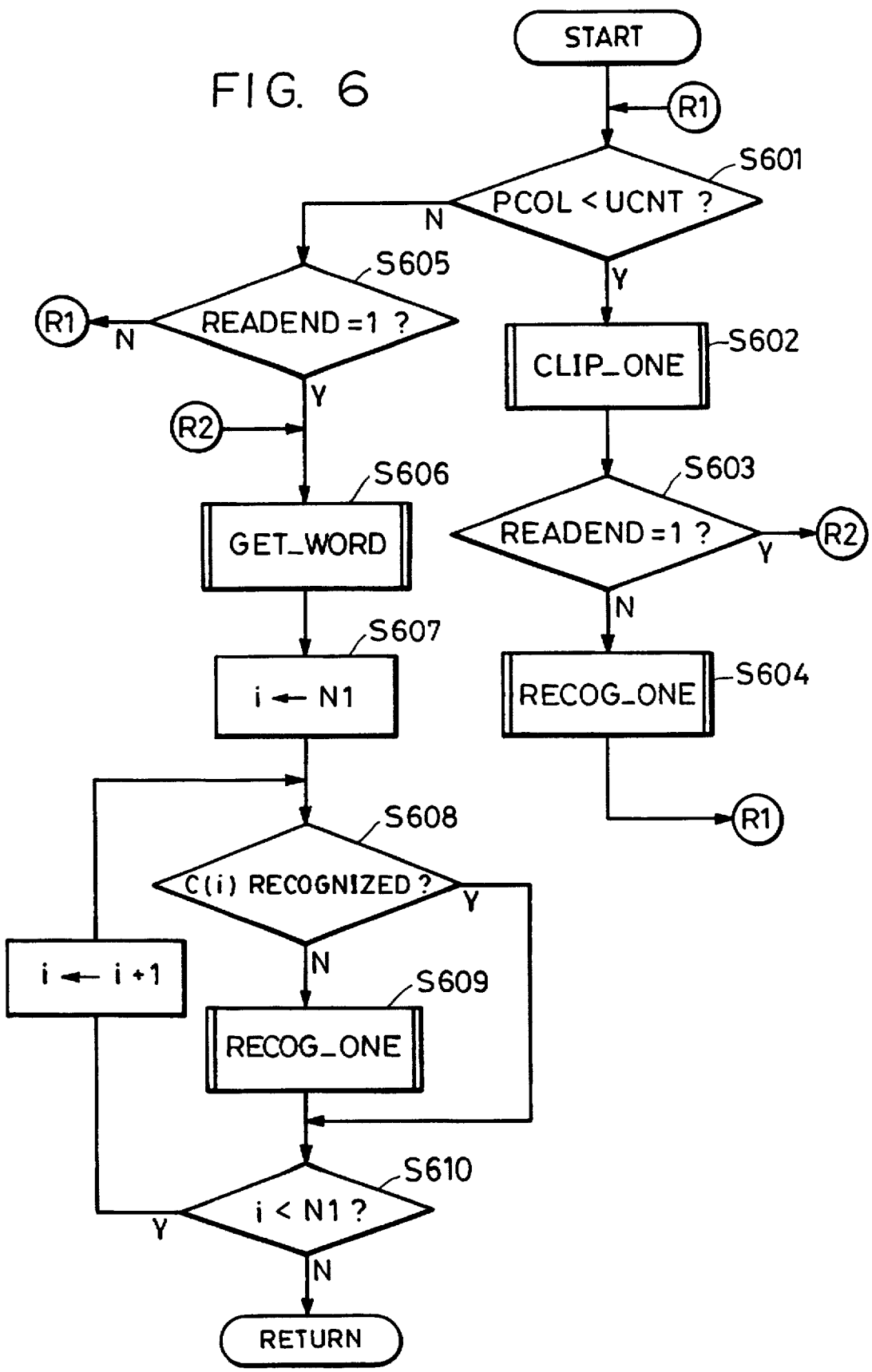
FIG. 6 is a flowchart of recognition processing RECOGX.

FIG. 4 is a flowchart showing the entire processing of the present embodiment. In step S401, character recognition is performed. In step S402, dictionary retrieval is performed using the obtained character string. In step S403, the result of translation is displayed. The character recognition in step S401 will be explained according to a flowchart shown in FIG. 5. In step S501, both a counter UCNT representing to which column in the image buffer data have been stored and a flag READEND representing the state of the scanner are set to 0 as the initial values, and interruption of the encoder is authorized. Step S502 is a subroutine RECOGX for performing character recognition processing. Three kinds of interruptions will occur during this processing. First, when a reading operation is manually started, the roller rotates to generate encoder interruption. If the encoder interruption occurs, an LED (light-emitting diode) is turned on in step S503, and a timer is set in step S504. When a time for storing data for one column in the scanner has lapsed after the timer was set, timer interruption is generated, and the data for one column is transferred from the scanner to the image buffer. In step S508, the value of the UCNT is incremented. In step S507, the LED is turned off in order to save power consumption. When the reading operation has been terminated, read-off interruption is generated by halting the pushing of the roller. This interruption sets the READEND to "1" in step S508. In step S509, interruption is prohibited.

Figure 10:
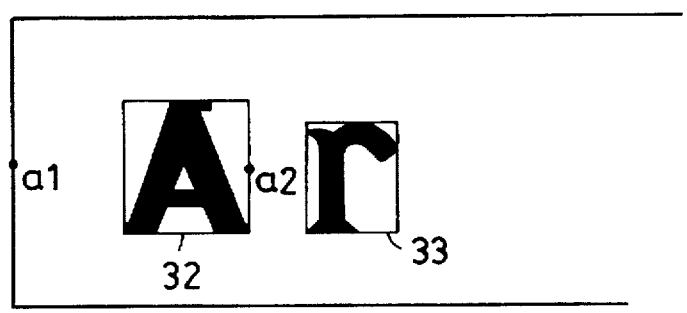
FIG. 10 is a diagram illustrating character segmenting processing by contour-line tracking.

In the present invention, character segmenting is performed by contour-line tracking. That is, as shown in FIG. 10, pixels are checked from a1 of the image buffer in the rightward direction, and contour-line tracking is started from a point where a black pixel is first hit. A circumscribing rectangle for one character can be determined from the minimum values and the maximum values in the x and y directions of a contour line obtained by making one round. For the second character, pixels are checked from position a2 situated at the right end of the circumscribing rectangle of an immediately preceding character in the x direction and at the center of the rectangle in the y direction in the rightward direction and the same processing is continued. Finally, the coordinates at the rightmost end reached during the contour-line tracking are set in a counter PCOL. The initial value of the PCOL is 0.

Next, processing in the RECOGX will be explained according to a flowchart shown in FIG. 8. If the value of the PCOL is not smaller than the value of the UCNT in step S601, data sufficient for character segmenting processing are not transferred to the image buffer. Hence, segmenting processing cannot be performed, and the process proceeds to step S605. If the READEND=1 (that is, the reading operation has been terminated in step S605), the process proceeds to step S606. If the READEND does not equal 1 in step S605, the process proceeds to R1. In step S606, a subroutine GET_WORD is evoked for taking out a word to be translated from the read character string. In the GET_WORD subroutine, the first position and the last position of the word to be translated are calculated for all characters C(i) (i=1, 2, ...., N) and set these positions to STC and ENDC, respectively. In step S607, N1 is set in a counter i for loop control. In a subroutine RECOG_ONE, a flag indicating a recognized character is raised every time a character is recognized. In step S608, the flag is checked. If an i-th character C(i) has already been recognized, the process proceeds to step S610, and the next character is checked. If the i-th character is not yet recognized, the subroutine RECOG_ONE is evoked to perform recognition for this character.

Referring again to step S601, if the value of the PCOL is smaller than the value of the UCNT, meaning that there is sufficient data for character segmenting in the image buffer, the process proceeds to step S602, where a subroutine CLIP_ONE is evoked for performing contour-line tracking for one character. If the READEND=1, that is, if the reading operation has been terminated after the end of the CLIP_ONE, in step S603, the process proceeds to R2. If the READEND is not 1 in step S603, the RECOG_ONE is evoked for performing recognition for one character in step S604.

Figure 7:
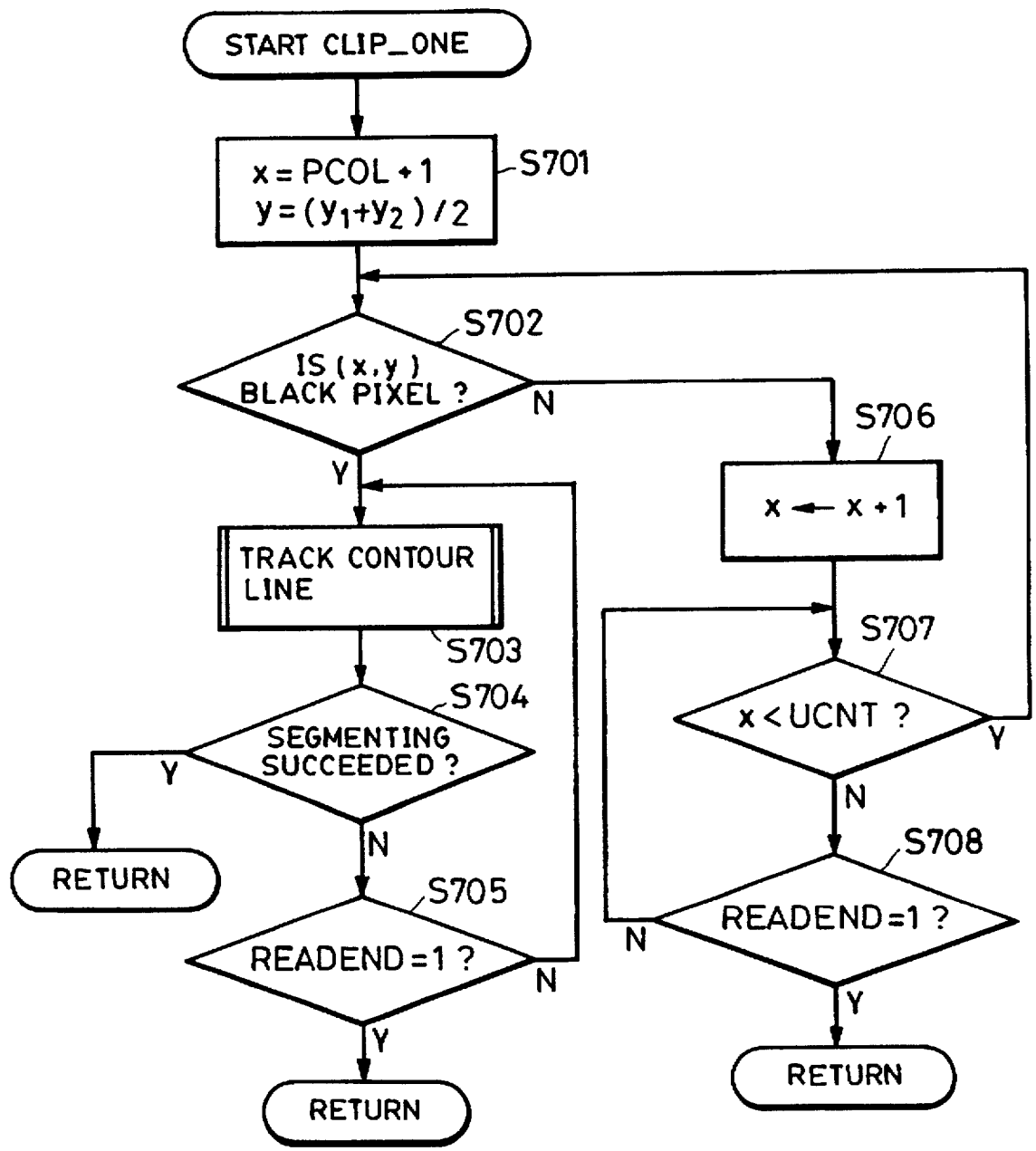
FIG. 7 is a flowchart of segmenting processing CLIP_ONE.

Next, an explanation will be provided for processing of the subroutine CLIP_ONE for performing segmenting processing with reference to the flowchart shown in FIG. 7. In step S701, the initial value is set in a counter (x, y) representing a target pixel. The initial value of x is the value of the PCOL, and the initial value of y is the average of the coordinate $y_1$ of the upper end of the immediately preceding character and the coordinate $y_2$ of the lower end of the character. For the first character, the central position between the upper and lower ends of the image buffer is used for the value of y. In step S702, it is determined whether or not the coordinates (x, y) represent a black pixel. If the result of the determination is affirmative, the process proceeds to step S703, where contour-line tracking is started. The contour-line tracking is terminated if the tracking returns to the original position after making one round (success of segmenting processing), or PCOL≧UCNT (stoppage of segmenting processing). If the segmenting processing has succeeded, the process returns from step S704. In step S705, the state of the READEND is checked. If the READEND is 1, the process returns to the start point. If the READEND is 0, the process returns to step S703, where the contour-line tracking is continued. If the result of the determination in step S702 is negative, the process proceeds to step S706, where the value of x is incremented. In step S707, the value x is compared with the value of the UCNT. If the value x is smaller than the value of the UCNT, the process returns to step S702, where the next pixel is checked. If the value x is not smaller than the value of the UCNT, the process proceeds to step S708. If the READEND is 1 in step S708, the process returns to the start point. If the READEND is not 1, the process returns to step S707, where it is awaited until the value of the UCNT is incremented.

Figure 8:
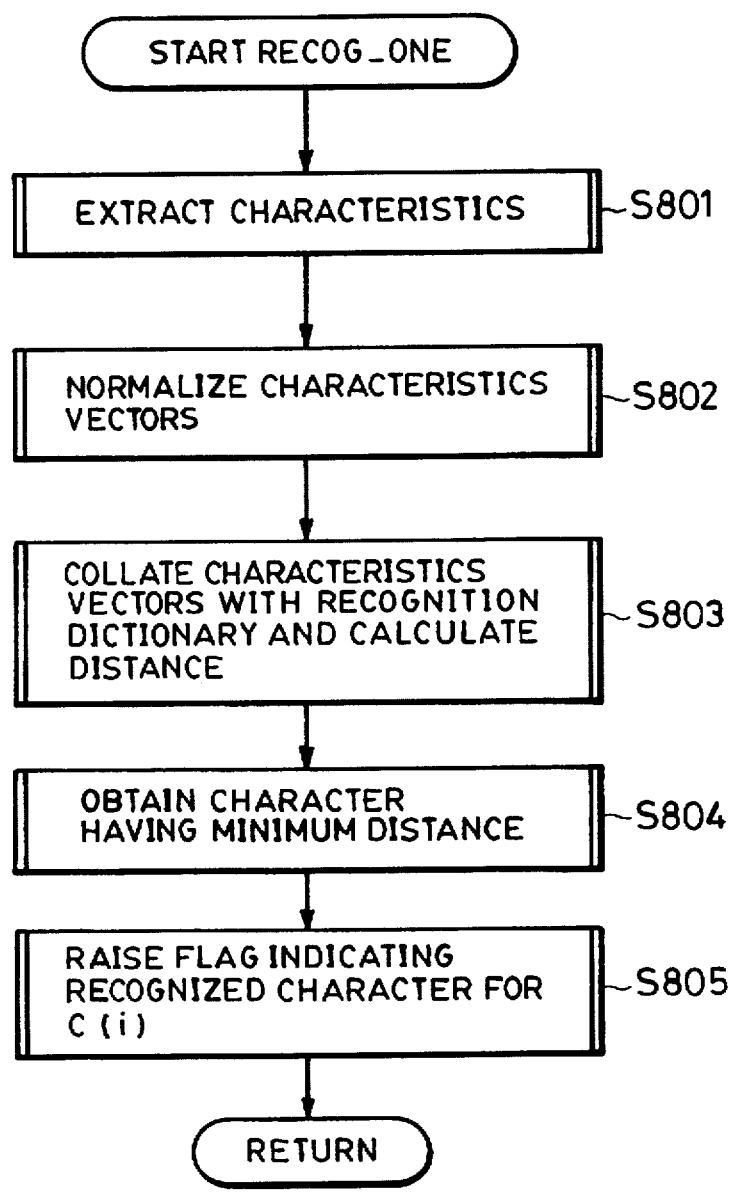
FIG. 8 is a flowchart of recognition processing RECOG_ONE for each character.

FIG. 8 is a flowchart of the subroutine RECOG_ONE for performing recognition for one character. In step S801, characteristics are extracted according to a predetermined algorithm, and characteristic vectors are obtained. In order to prevent variation in characteristics due to the size of the character, the characteristic vectors are normalized. Subsequently, in step S803, the distance to the input vector is calculated using the average and variance of the character vectors for each character which have been calculated previously. In step S804, the distances obtained for respective characters are compared with one another, and a character which has a minimum distance is selected as a candidate for the recognized character. In step S805, a flag indicating that recognition processing has been terminated for this character is raised.

Figure 9:
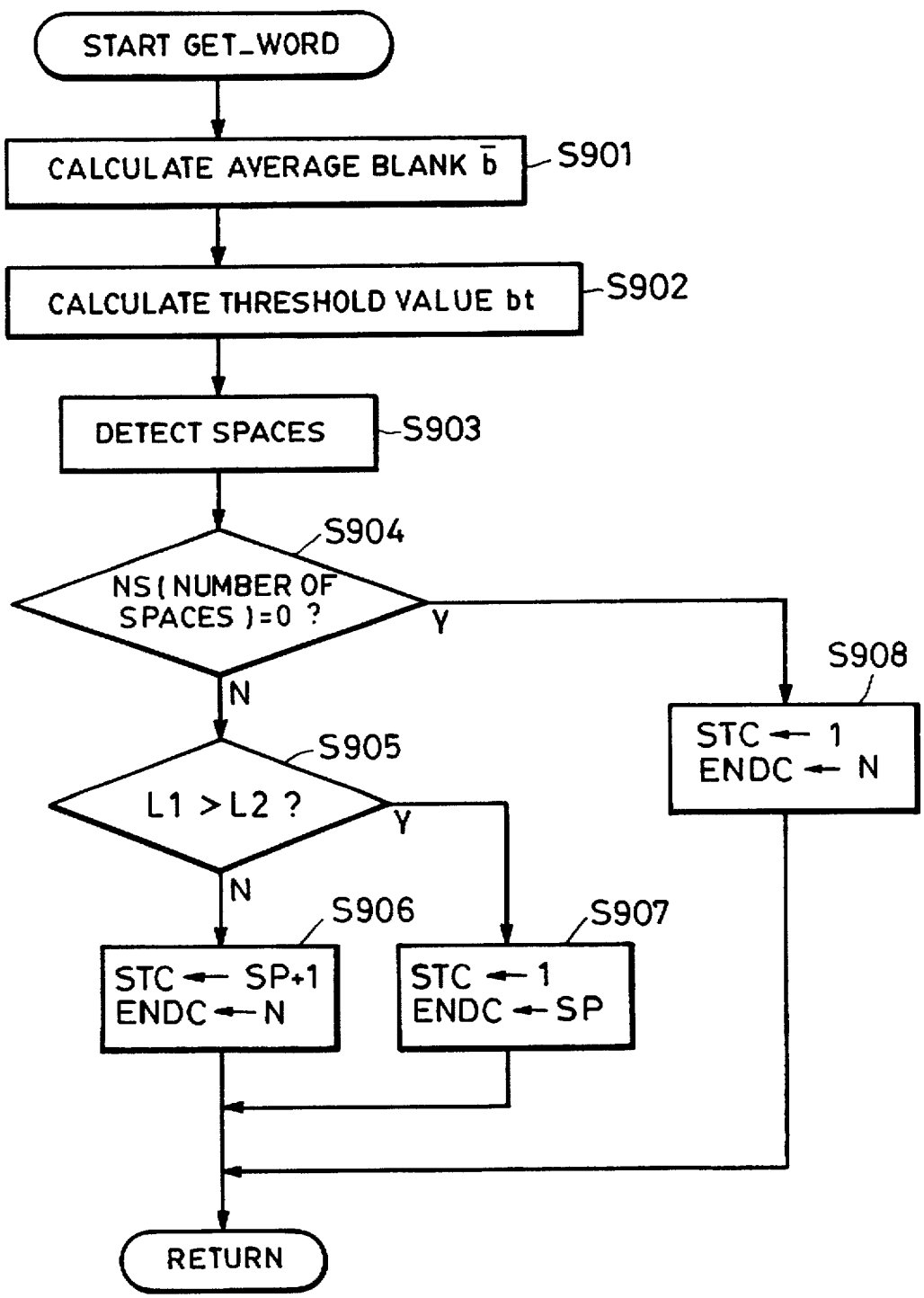
FIG. 9 is a flowchart of word extracting processing GET_WORD.
Figure 11:
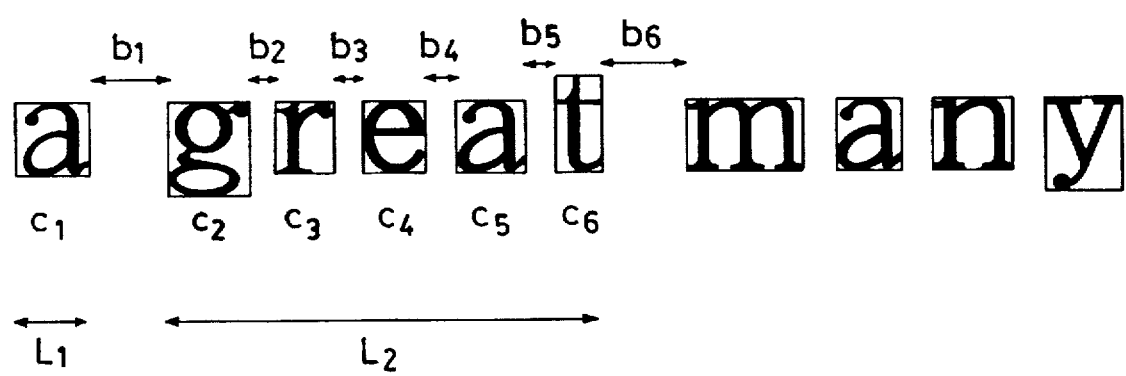
FIG. 11 shows an example of extraction of a word.
Figure 12:
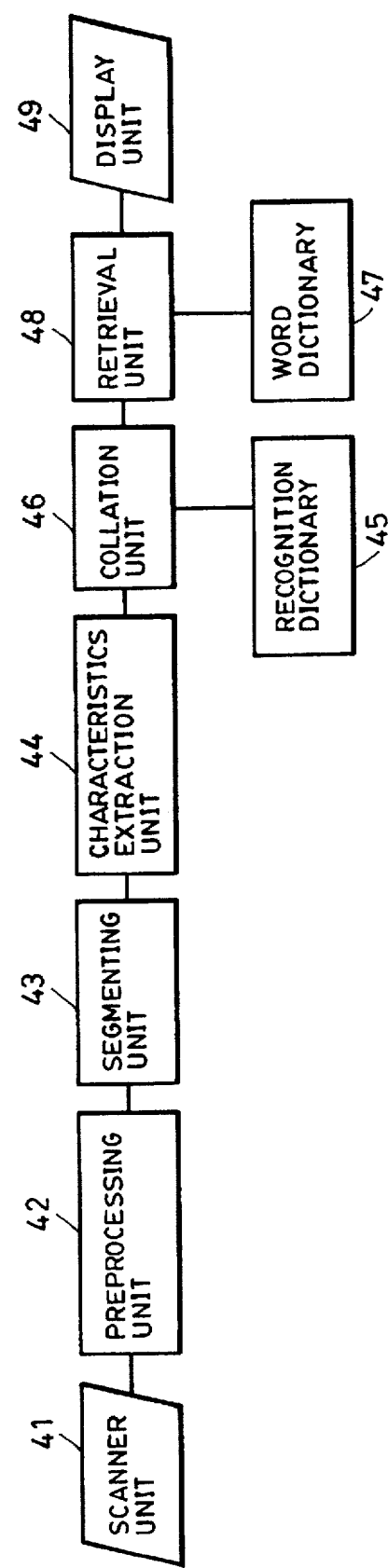
FIG. 12 is an example of the configuration of a conventional recognition-type electronic dictionary.

Next, an explanation will be provided for word selection processing in the subroutine GET_WORD with reference to the flowchart shown in FIG. 9. FIG. 11 illustrates a segmented character string. As a result of character segmenting processing by contour-line tracking, circumscribing rectangles Ci (i=1, 2, . . . , N) and intervals bi (i=1, 2, . . . , N-1) (hereinafter termed blanks) between adjacent characters are obtained.

First, in step S901, the average b of blanks is calculated. At that time, calculation is performed with removing the maximum value bmax1 and the second largest value bmax2 of the bi's.

$$\bar{b} = \left( \sum_{i=1}^{N} bi - bmax1 - bmax2 \right) /(N-2),$$

where it is assumed that $\bar{b}$=min(b1, b2) when N=2.

Subsequently, in step S902, a threshold value bt for determining an interval (hereinafter termed a space) between adjacent words is calculated according to the following expression:

$$bt = \alpha \cdot \bar{b} + \beta,$$

where $\alpha$ and $\beta$ are predetermined threshold values. In step S903, the values of bi's are sequentially checked, and a blank in which bi>bt is determined as a space. If the number NS of spaces is 0 in step S904, the process proceeds to step S908. If the number NS is not 0, the process proceeds to step S905. In step S908, the value 1 is set to a counter STC representing the leading position of the word to be translated, and sets the number N of the total segmented characters in a counter ENDC representing the last position of the word. When a space is present, if the position of the first space is next to the k-th character, the value k is set in a counter SP representing the position of the space. In step S905, the length $L_1$ of the character string immediately preceding the SP is compared with the length $L_2$ of the character string immediately after the SP (see FIG. 11). If the $L_1$ is longer than the $L_2$, SP+1 and N are set in the STC and the ENDC, respectively, in step S906. If the $L_1$ is not longer than the $L_2$, 1 and SP are set in the STC and the ENDC, respectively, in step S907.

Although, in the above-described embodiment, an English sentence is read and translated into Japanese, any other language may, of course, be read, provided that spaces are present between words.

The present invention does not depend on a recognition algorithm and an algorithm for extracting a word, but can, of course, be applied to any other methods.

Although, in the above-described embodiment, read-off interruption (that is, the end of a reading operation) is detected upon the release of a pushing state of the roller, a read button may be mounted on the main body of the apparatus, a read key may be depressed in a reading operation, and read-off interruption may be generated when the read key is released.

The present invention may, of course, be applied to a system comprising a plurality of apparatuses, an apparatus comprising only one unit, or a case in which a system or an apparatus is supplied with a program.

What is claimed is:

1. An image processing apparatus, comprising:

input means for inputting an image;

segmenting means for segmenting one character image from the input image;

recognition means for recognizing said segmented one character image;

first controlling means for controlling operation of said segmenting means and said recognition means such that the one character image segmentation and the segmented one character image recognition are repeated;

detection means for detecting an interruption of said input of the image; and second controlling means for interrupting, in response to said detection of the interruption, said first controlling means and for controlling operation of said segmenting means and said recognition means such that segmentation is repeated without performing recognition until a word is removed from a string of input characters.

2. An apparatus according to claim 1, wherein said image input means sequentially inputs character image information horizontally in rows.

3. An image processing apparatus according to claim 1, wherein said image has been input from a manual scanner.

4. An image processing apparatus according to claim 1, further comprising means for displaying recognized character.

5. An image processing apparatus according to claim 1, further comprising means for translating a recognized word into a word of another language.

6. An image processing apparatus according to claim 1, further comprising means for storing said input image.

7. An image processing apparatus according to claim 1, further comprising means for detecting an end of image input.

8. An image processing method comprising the steps of:

inputting an image;

segmenting one character image from the input image;

recognizing said segmented one character image;

first step for controlling said segmenting step and said recognition step such that the one character image segmentation and the segmented one character image recognition are repeated;

detecting an interruption of said input of the image; and second step for interrupting, in response to said detection of the interruption, said first controlling step and for controlling operation of said segmenting step and said recognition step such that segmentation is repeated without performing recognition of a segmented image until a word is removed from a string of input characters.

9. A method according to claim 8, wherein image information, of at least one row of character image data, is sequentially input in the horizontal direction of rows.

10. An image recognition method according to claim 8, wherein said input image has been input from a manual scanner.

11. An image recognition method according to claim 8, further comprising the step of displaying recognized characters.

12. An image recognition method according to claim 8, further comprising the step of translating recognized word into a word of another language.

13. An image recognition method according to claim 8, further comprising the step of storing said input image.

14. An image recognition method according to claim 8, further comprising the step of detecting an end of image input.

* * * * *